United States Patent
Xie et al.

(10) Patent No.: US 10,819,813 B2
(45) Date of Patent: Oct. 27, 2020

(54) MESSAGE PUSHING METHOD AND APPARATUS THEREOF

(71) Applicant: Beijing Xiaomi Mobile Software Co., Ltd., Beijing (CN)

(72) Inventors: Yan Xie, Beijing (CN); Yueyue Chu, Beijing (CN); Yue Cheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 50 days.

(21) Appl. No.: 15/835,026

(22) Filed: Dec. 7, 2017

(65) Prior Publication Data

US 2018/0167477 A1    Jun. 14, 2018

(30) Foreign Application Priority Data

Dec. 9, 2016  (CN) .......................... 2016 1 1126251

(51) Int. Cl.
*H04L 29/08* (2006.01)
*H04W 68/02* (2009.01)
*H04L 12/58* (2006.01)
*H04L 12/18* (2006.01)
*H04W 4/12* (2009.01)

(52) U.S. Cl.
CPC .......... *H04L 67/26* (2013.01); *H04L 12/1859* (2013.01); *H04L 51/04* (2013.01); *H04L 67/22* (2013.01); *H04L 67/303* (2013.01); *H04L 67/306* (2013.01); *H04W 68/02* (2013.01); *H04W 4/12* (2013.01)

(58) Field of Classification Search
CPC ... H04L 67/26; H04L 12/1859; H04L 67/303; H04L 67/22; H04L 51/04; H04L 67/306; H04L 67/24; H04W 68/02; H04W 4/12
See application file for complete search history.

(56) References Cited

U.S. PATENT DOCUMENTS

| | | | | |
|---|---|---|---|---|
| 8,176,176 B1 * | 5/2012 | Chan | ....................... | H04L 67/22 |
| | | | | 455/405 |
| 8,983,449 B1 | 3/2015 | Booth et al. | | |
| 2008/0065734 A1 * | 3/2008 | Yu | ........................... | H04L 51/24 |
| | | | | 709/206 |

(Continued)

FOREIGN PATENT DOCUMENTS

| | | |
|---|---|---|
| CN | 102411596 A | 4/2012 |
| CN | 104394061 A | 3/2015 |

(Continued)

OTHER PUBLICATIONS

Search Report in corresponding European Patent Application No. 17206211.9, dated Mar. 23, 2018, 9 pages.

(Continued)

*Primary Examiner* — Soe Hlaing
(74) *Attorney, Agent, or Firm* — Arch & Lake LLP (57) ABSTRACT

A message pushing method and an apparatus are provided in the field of electronic technology. The method may include: acquiring a push message corresponding to a target user account; acquiring a state parameter for each smart device that is bound to the target user account; determining whether each smart device is in an active state based on the state parameter; and sending the push message to at least one target smart device in the active state.

14 Claims, 6 Drawing Sheets

(56) References Cited

U.S. PATENT DOCUMENTS

| | | | |
|---|---|---|---|
| 2012/0036261 A1 | 2/2012 | Salazar et al. | |
| 2015/0032887 A1* | 1/2015 | Pesek | G06F 21/305 |
| | | | 709/224 |
| 2015/0149566 A1 | 5/2015 | Shmilov et al. | |
| 2016/0301649 A1* | 10/2016 | Faaborg | H04L 51/04 |

FOREIGN PATENT DOCUMENTS

| | | | |
|---|---|---|---|
| CN | 104503834 | A | 4/2015 |
| CN | 104917716 | A | 9/2015 |
| CN | 105245577 | A | 1/2016 |
| CN | 105511946 | | 4/2016 |
| CN | 105721694 | A | 6/2016 |
| CN | 106101826 | A | 11/2016 |
| WO | 2015184359 | A2 | 12/2015 |

OTHER PUBLICATIONS

Third Office Action of Chinese Application No. 201611126251.X dated Jul. 17, 2019 with English translation, (26p).
First Office Action and search report issued in corresponding Chinese Application No. 201611126251.X, dated Dec. 4, 2018, 10 pages.
Second Office Action and search report issued in corresponding Chinese Application No. 201611126251.X, dated Apr. 30, 2019, 8 pages.

* cited by examiner

MESSAGE PUSHING METHOD AND APPARATUS THEREOF

CROSS-REFERENCE TO RELATED APPLICATION

This application claims priority to Chinese Patent Application No. 201611126251.X, filed with the State Intellectual Property Office on Dec. 9, 2016 and titled "MESSAGE PUSHING METHOD AND APPARATUS THEREOF," the entire contents of which are incorporated herein by reference

TECHNICAL FIELD

The present disclosure relates to electronic technology, particularly to a message pushing method and apparatus thereof.

BACKGROUND

With the rapid development of internet, the functionalities of smart devices become more and more plentiful. In order to facilitate unified management of a plurality of smart devices, users can register a user account in a server via a smart device and then bind a plurality of smart devices to this user account. For example, a user can bind his mobile phone, tablet, TV, etc. to a user account.

SUMMARY

Embodiments of the present disclosure provide a message pushing method and apparatus thereof, as follows:

According to a first aspect of the present disclosure, a message pushing method is provided. The method may be applied to a server and may include: acquiring a push message corresponding to a target user account: acquiring a state parameter for each smart device that is bound to the target user account: determining whether each smart device is in an active state based on the state parameter; and sending the push message to at least one target smart device in the active state.

According to a second aspect of the present disclosure, a message pushing apparatus is provided. The apparatus is applied to a server and may include: a processor; and a memory storage storing executable instructions executed by the processor. The processor is configured to: acquire a push message corresponding to a target user account; acquire a state parameter for each smart device that is bound to the target user account; determine at least one target smart device by determining whether each smart device is in an active state in accordance with the acquired state parameter; and send the push message to the at least one target smart device.

According to a third aspect of the present disclosure, there is provided a non-transitory computer readable storage medium having stored therein at least an instruction, a program, a code set or instruction set, to be loaded and executed on a processor for performing the message pushing method provided in the first aspect or any embodiment in the first aspect.

It is to be understood that both the foregoing general description and the following detailed description are exemplary and explanatory only and are not restrictive of the invention, as claimed.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The accompanying drawings, which are incorporated in and constitute a part of this specification, illustrate embodiments consistent with the invention and, together with the description, serve to explain the principles of the invention.

DETAILED DESCRIPTION OF THE EMBODIMENTS

The present disclosure will be described in further detail with reference to the enclosed drawings, to clearly present the objects, technique solutions, and advantages of the present disclosure. Apparently, the embodiments described in the present disclosure are not representative of all embodiments. Any other embodiment derived by a person of ordinary skill in the art from the embodiments of the present disclosure without creative efforts will be protected by the present disclosure.

In the related art, when a server receives a push message for a particular user account (for example, an instant communication message or a logistics update message), for the user's convenience to get informed about the push message in time, the server can send the push message to all the smart devices bound to the user account. However, it will use much of network resource to take the method to send the push message with the related art, when many smart devices are bound to a user account.

Figure 1:
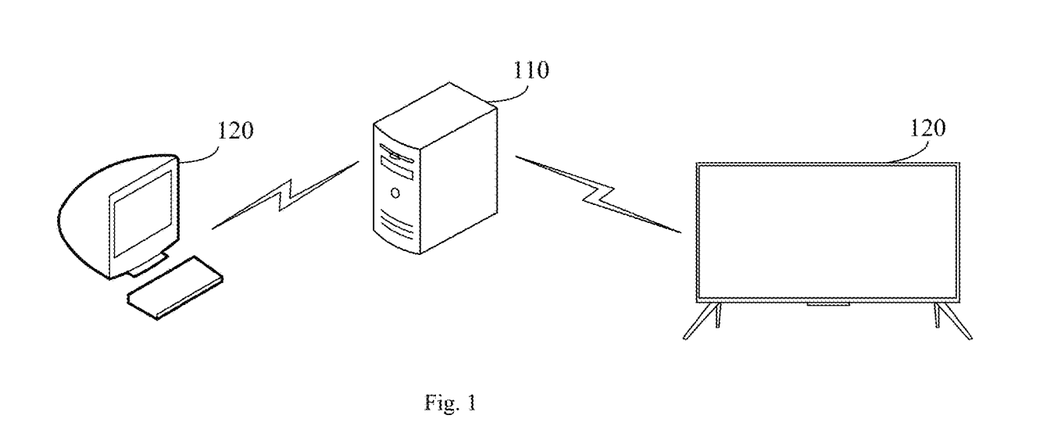
FIG. 1 is a schematic diagram of an implementation environment for a message pushing method shown in accordance with one or more exemplary embodiments.

FIG. 1 illustrates an implementation environment for a message pushing method shown in accordance with one or more exemplary embodiments. The implementation environment may include: server 110 and one or a plurality of smart devices 120. The server 110 can be a server, a server group including several servers, or a cloud-computing center. The smart devices 120 can be smart phones, computers, smart TVs, smart rearview mirrors, smart refrigerators, or wearable devices. The connection between the server 110 and the plurality of smart devices 120 can be established via a wired network or a wireless network. A user can register a user account in the server 100 via any one of the smart devices 120 and bind the plurality of the smart devices 120 to this user account. When the server receives the push message for this user account, it can make the one or a plurality of smart devices 120 upload the state parameters and determine at least one target smart device in active state in accordance with the acquired state parameters in order to send the push message to the at least one target smart device.

Figure 2:
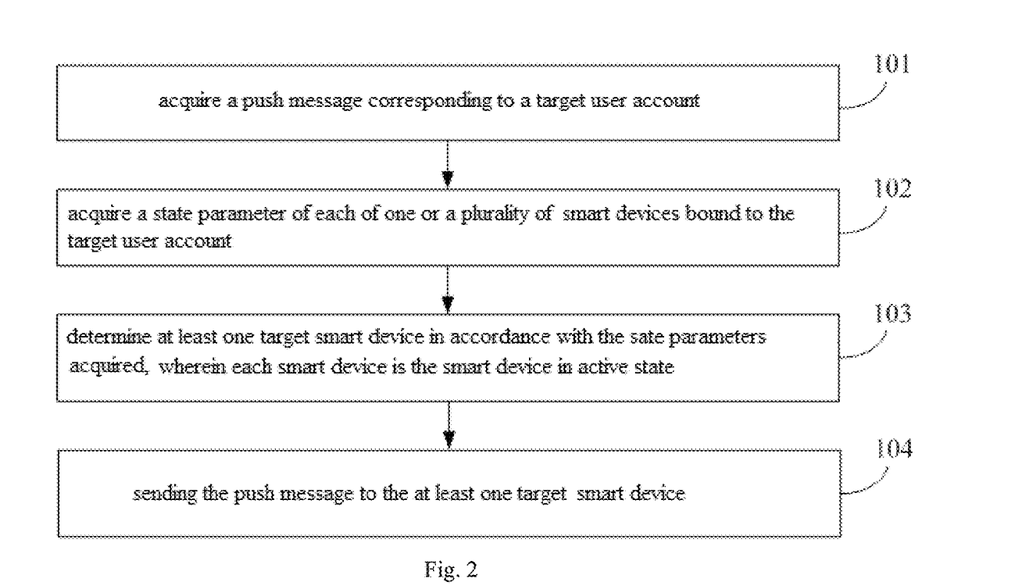
FIG. 2 is a flowchart of a message pushing method shown in accordance with one or more exemplary embodiments.

FIG. 2 is a flowchart of a message pushing method shown in accordance with one or more exemplary embodiments. The method is applied to the server 100 shown in FIG. 1. As shown in FIG. 2, the method comprises:

In step 101, a push message corresponding to a target user account is acquired. The push message may include a social network message, a reminder, or any other application message pushed to the target user.

In step 102, a state parameter of each of one or a plurality of smart devices bound to the target user account is acquired. The state parameter may include user interaction data indicating whether the corresponding smart device is in an active state.

In step 103, at least one target smart device is determined in accordance with the acquired state parameters, where each target smart device is the smart device in active state. The active state may be preset or defined by a user in a user profile on one of the smart devices.

In step 104, the push message is sent to the at least one target smart device. When there is at least one target smart device in the active state, the push message is pushed to the at least one target smart device.

In summary, a message pushing method is provided in the embodiments of the present disclosure. With this message pushing method, the server may send the push message to the at least one target smart device in active state. Since the server does not need to push the message to every smart device any more, it can reduce the use of network resource when the message is pushed so that it can improve the efficiency of pushing message. Since each target smart device is the smart the device in active state, it can guarantee that the user will be able to read the push message in time.

Figure 3:
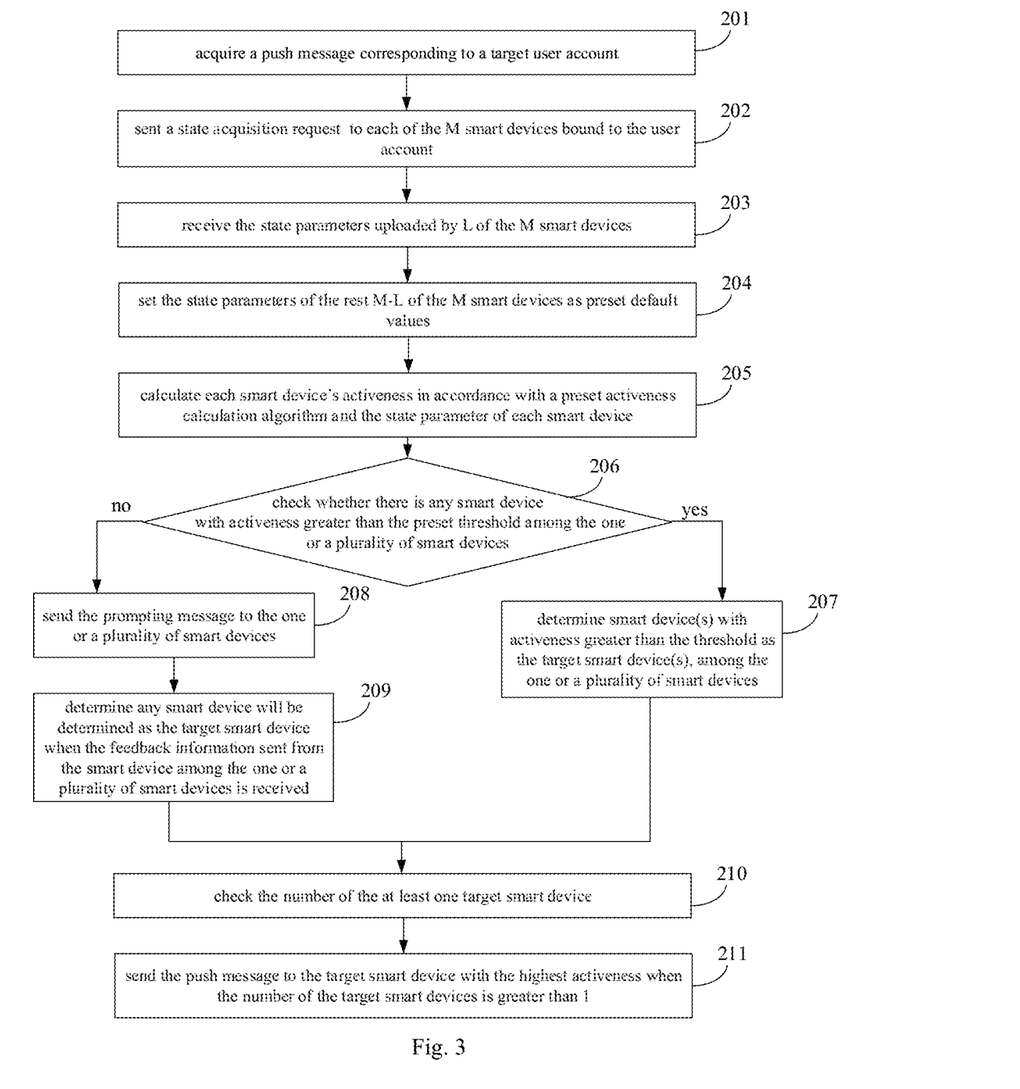
FIG. 3 is a flowchart of another message pushing method shown in accordance with one or more exemplary embodiments.

FIG. 3 illustrates a flowchart of another message pushing method shown in accordance with one or more exemplary embodiments. This method can also be applied to the server 110 shown in FIG. 1. Referring to FIG. 3, this method comprises:

In step 201, the push message corresponding to the target user account is acquired.

In the embodiments of the present disclosure, the server can be either a system server or an application server. When the server is a system server, the push message can be a recommendation message for the system application uploaded by the operators or an operational prompting message. When the server is an application server, the type and the source of the push message can be different in accordance with the type of the application server. For example, the push message can be an instant message sent from a client end or an information message uploaded by the operators, when the application server is an instant message server; the push message can be a logistics update message uploaded by the operators or a commodity recommendation message generated by the purchasing application server, etc., when the application server is a purchasing application server. The server type and the push message type are not limited by the embodiments of the present disclosure.

Here, the system server can be a server arranged by the smart device manufacturer and used to support the operating system in the smart device, and the application server can be a server arranged by the application supplier and used to offer application service.

For example, assuming that the server is an instant message server, when an instant message client end sends an instant message "Do you have time tonight? Let's have dinner together" to another client end with a user account 1234, the instant message server can receive the instant message for the target user account 1234.

In step 202, a state acquisition request is sent to each of the M smart devices bound to the user account.

In the embodiments of the present disclosure, the user can register a user account in the server via a smart device. After the user logs in to the user account via one of the smart devices, the server can save the correlation between the user account and this smart device's identifier, which means that the server can bind this smart device to the user account. When the user logs in to the same user account via a plurality of smart devices simultaneously, the server may save the correlation between the user account and the identifiers for the plurality of smart devices, which means that the server can bind the plurality of smart devices to this user account.

Here, the smart device's identifier can be a unique character string for this device, for example, the smart device's Media Access Control (MAC), the smart device's Subscriber Identification Module (SIM) card number, or the manufacturer's serial number. Alternatively, the smart device's identifier may be distributed to each smart device by the server. For example, when the server detects that the same user account is logged in though a plurality of smart devices simultaneously, it may distribute an exclusive identifier to each smart device, and save the correlation between the user account and the plurality of smart devices.

After the server receives the push message for the target user account, M smart devices bound to the target user account can be determined according to the correlation between the user account and the smart devices saved in advance, where M is an integer greater than or equal to 1. Further, the server can also send the state acquisition request to each of the M smart devices. The state acquisition request may include the detailed state parameter type required by the server. The state parameter may include at least one of the followings: current screen mode, touch operation times received within a preset period of time, and elapsed time between the moment when receiving the last touch operation and present moment.

Here, the current screen mode may include an awake mode or an off mode. The awake mode may also be referred as the on mode. The received touch operation may refer to the touch operation operated by the user directly or via the control device such as the remote control by the user. The touch operation operated by the user directly may include touch screen operation, voice operation, key operation and the like; the preset period of time can be set in advance as, for example, half an hour or 15 minutes; and the touch operation times received within a preset period of time may refer to touch operation times received within the preset time period before the present moment.

For example, assuming that the smart devices commonly used by a user include mobile phone A, mobile phone B, tablet C, laptop computer D, and TV E. When all of the five smart devices are installed with an instant message client end and the user logs in to the same user account 1234 via each individual instant message client end in the five smart devices, the correlation between the user account and the smart device's identifier saved in the instant message server can be shown in Table 1. Wherein, five smart devices are bound to the user account and the identifiers for the five smart devices are A, B, C, D, and E respectively. Two smart devices are bound to the user account 5678 and the identifiers for the two smart devices are F and G respectively.

TABLE 1

| User Account | Smart Device's Identifier |
| --- | --- |
| 1234 | A, B, C, D, E |
| 5678 | F, G |

Figure 4:
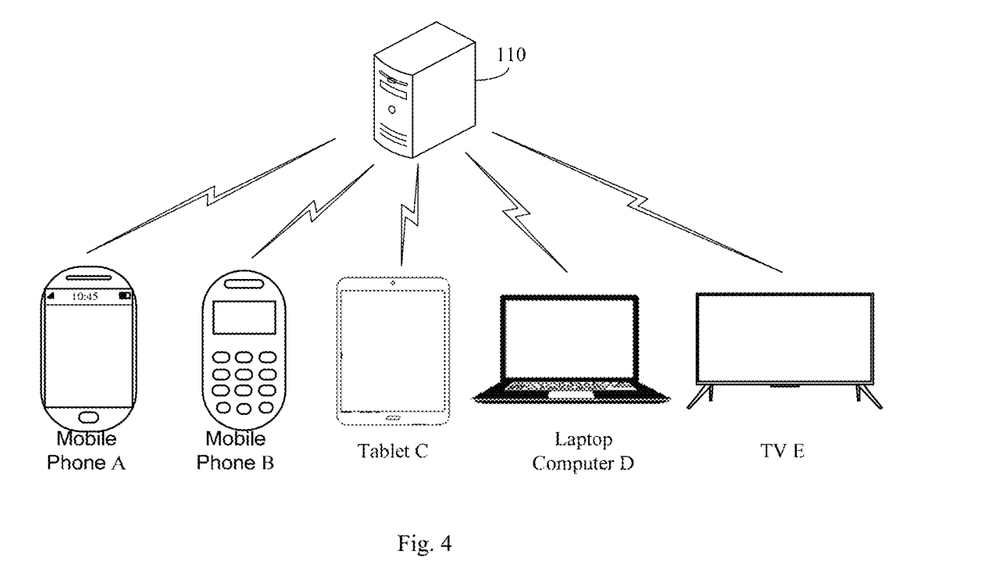
FIG. 4 is a schematic diagram of sending a state acquisition request by a server shown in accordance with one or more exemplary embodiments.

In accordance with the correlation shown in Table 1, it can be concluded that the smart devices bound to the target user account 1234 include mobile phone A, mobile phone B, tablet C, laptop computer D, and TV E. FIG. 4 illustrates the state acquisition request sent by the server. Referring to FIG. 4, the instant message server 110 may send the state acquisition request to the five smart devices: mobile phone A, mobile phone B, tablet C, laptop computer D, and TV E respectively. The state acquisition request contains the detailed state parameter type required by the instant message server. The detailed state parameter type may include: the current screen mode, the touch operation times received by the server in half an hour, and the elapsed time between the moment when receiving the last touch operation and the present moment. Here, the touch operation times received within half an hour may refer to the touch operation times received within half an hour before the present moment.

In step 203, the state parameters uploaded by L of the M smart devices are received.

Here, L satisfies: 0≤L≤M and L is an integer. After the server sends the state acquisition request to the M smart devices respectively, since some of the smart devices may be in an off mode, for example, the device is not powered on or the network is offline, the smart devices in the off mode will not upload state parameters to the server. That means the server can only receive the state parameters uploaded by the L smart devices in the on mode (On mode means that devices are powered on and network connection is kept open between the devices and the server). Wherein, each smart device in the on mode may acquire a corresponding state parameter in accordance with the specific state parameter type in the state acquisition request, and upload the state parameter to the server.

For example, assuming that among the five smart devices of mobile phone A, mobile phone B, tablet C, laptop computer D, and TV E, mobile phone A, tablet C and TV E are in the on mode and mobile phone B and laptop computer D are in the off mode. Then, mobile phone A, tablet C. and TV E which are in the on mode will acquire the current screen mode, touch operation times received in half an hour before the present moment and the elapsed time between the last received touch operation moment and the present moment respectively, and then upload the acquired state parameters to the server.

Assuming that it is 12:30 now (i.e. the time when the server sends the state acquisition request to each smart device), and the user turns on mobile phone A, tablet C, and TV E respectively after arriving home at 11:30, turns off the tablet screen at 11:50, changes the TV channels twice between 12:00 and 12:30, and watches TV while playing on the mobile phone between 12:00 and 12:30. Then, the uploaded state parameters can be shown in Table 2 after the three smart devices receive the state acquisition request at 12:30. Wherein, the state parameters uploaded by the mobile phone A include: the current screen is in the awake mode, five touch operations are received within half an hour before the present moment, and the elapsed time between the last received touch operation moment and the present moment is 5 minutes.

TABLE 2

| | | State parameters | |
| --- | --- | --- | --- |
| Smart devices | Current screen mode | Touch operation times received within half an hour | The elapsed time between the last received touch operation moment and the present moment |
| A | Awake mode | 5 | 5 minutes |
| C | Off mode | 0 | 40 minutes |
| E | Awake mode | 2 | 30 minutes |

In step 204, the state parameters of the (M-L) of the M smart devices are set as preset default values. Here, the (M-L) smart device include the rest devices besides the L of the M smart devices.

In the embodiments of the present disclosure, when some of the M smart devices are in the off mode and do not upload state parameters (L<M), the server can set the state parameters of the (M-L) smart devices which do not upload the state parameters as the preset default values. These default values may indicate that the corresponding smart devices are in the non-active state.

For example, since the mobile phone B and laptop computer D of the five smart devices do not upload the state parameters, the instant message server can set the state parameters of the mobile phone B and laptop computer D as the preset default values. These preset default values may include: the current screen is in the off mode, 0 touch operation is received within half an hour, the elapsed time between the last received touch operation moment and the present moment is 24 hours.

In step 205, each smart device's activeness is calculated in accordance with a preset activeness calculation algorithm and the state parameter of each smart device.

After acquiring the state parameter of each of the one or a plurality of smart devices bound to the target user account through above step 203 and step 204, the server can calculate each smart device's activeness in accordance with the preset activeness calculation algorithm and the state parameter of each smart device, to accurately evaluate each smart device' activeness.

In the embodiments of the present disclosure, the state parameter uploaded by each smart device may include N sub-parameters, where N is a positive integer. For example, the state parameter may include: current screen mode, touch operation times received within a preset period of time, and elapsed time between the last received touch operation moment and present moment, totally three sub-parameters. Furthermore, the server may also save the weighting of each sub-parameter. To be specific, for each sub-parameter, the server can save the correlation between the value range of the parameter value and the weighting. After receiving the state parameter uploaded by each smart device, the server may determine the value range in which the parameter value of each of the N sub-parameters of each smart device is: then, the server determines the weighting corresponding to the value range in which the parameter value of each sub-parameter is, in accordance with the correlation between the value range of the parameter value and the weighting saved in advance.

To be exemplary, for the sub-parameter "the current screen mode," its parameter value may include the awake mode and the off mode. In the correlation between the value range of the parameter value and the weighting saved in the server, the weighting for the current screen mode that is the awake mode is greater than the weighting for the current screen mode which is the off mode. For the sub-parameter "the weighting for the touch operation times received within the preset period of time." the weighting of which is directly proportional to the touch operation times. That is to say, for the sub-parameter "touch operation times received within the preset period of time", in the correlation between the value range of the parameter value and the weighting saved in the server, the more the touch operation times are, the higher the corresponding weighting is: but, for the sub-parameter "the elapsed time between the last received touch operation moment and present moment", the weighting saved in the server is inversely proportional to the elapsed time. That is to say, for the sub-parameter "the elapsed time between the last received touch operation moment and present moment", in the correlation between the value range of the parameter value and the weighting saved in the server, the longer the elapsed time between the last received touch operation moment and present moment, the lower the corresponding weighting is. It can be concluded from the above analysis that the weighting of each sub-parameter saved in the server is positively correlated with the smart device's activeness. The higher the activeness for the smart device is, the greater the weighting of the sub-parameter of the state parameter is.

Further, after the server acquires the weighting of each of the N sub-parameters of each smart device, it can determine each smart device's activeness in accordance with the following formula (1).

$$W_i = \sum_{j=1}^{N} W_{ij},$$ Formula (1);

Wherein, $W_i$ is the activeness of the $i^{th}$ smart device, $W_{ij}$ is the weighting of the $j^{th}$ sub-parameter of the $i^{th}$ smart device, j is a positive integer less than or equal to N.

For example, assuming the correlation between the sub-parameter and its weighting saved in the instant message server is shown in FIG. 3. For the sub-parameter of the state parameters "the current screen mode", its corresponding weighting is 20 when the parameter value is in the awake mode; its corresponding weighting is 0 when the parameter value is in the off mode; for the sub-parameter of the state parameters "the touch operation times received within half an hour", its corresponding weighting is 10 when the parameter value is greater than 5; for the sub-parameter of the state parameters "the elapsed time between the last received touch operation moment and present moment", its corresponding weighting is 20 when the value range which the parameter value is in is less than 1 minutes, and its corresponding weighting becomes 0 when the value range which the parameter value is in is greater than half an hour.

From Table 2 and Table 3, it can be concluded that among the state parameters of the first smart device of the mobile phone A, the state sub-parameter "the weighting $W_{12}$ corresponding to the touch operation times received within half an hour" is 5, and the state sub-parameter "the weighting $W_{13}$ corresponding to the elapsed time between the last received touch operation moment and the present moment" is 10, when state sub-parameter "the weighting $W_{11}$ corresponding to the current screen interface" is 20. In accordance with formula (1), the activeness W1 of the mobile phone A can be calculated: $W1=W_{11}+W_{12}+W_{13}=20+5+10=35$.

Similarly, in accordance with the state parameter uploaded by each smart device shown in Table 2, the state parameters of the rest M-L smart devices determined by the server, and the activeness calculation algorithm shown in Formula (1), each other smart device's activeness calculated by the instant message server can be:

The activeness of mobile phone B: W2=0: the activeness of tablet C: W3=0; the activeness of laptop computer D: W4=0: the activeness of TV E: W3=20+5+5=30.

TABLE 3

| Sub parameters | Weightings | |
| --- | --- | --- |
| Current screen mode | Awake mode | 20 |
| | Off mode | 0 |
| Received touch operation times within half an hour | Less than 1 time | 0 |
| | 1 to 5 times | 5 |
| | Greater than 5 times | 10 |
| The elapsed time between the last received touch operation moment and present moment | Less than 1 minute | 20 |
| | 1 to 10 minutes | 10 |
| | Greater than 10 minutes and less than or equal to half an hour | 5 |
| | Greater than half an hour | 0 |

Noticeably, in practice, for the smart device which doesn't upload state parameter, the server not only can set the state parameter of the smart device as the preset default value but also can set the activeness of this smart device to 0. Here, the server does not need to calculate the activeness of this smart device any more so that the computational complexity in the server can be reduced.

In step 206, whether there is any smart device with activeness greater than the preset threshold is checked among the one or a plurality of smart devices.

When there are smart devices with activeness greater than the preset threshold among the one or a plurality of smart devices, step 207 is executed, otherwise, step 208 is executed. In the embodiments of the present disclosure, the preset threshold can be set in advance by the server in accordance with the weighting of each sub-parameter. For example, the server can acquire in advance the state parameters of a plurality of smart devices that have been determined to be in the active state, calculate the activeness of the plurality of smart devices in the active state in accordance with the preset activeness calculation algorithm, and then set the average value of a plurality of activeness calculated as the preset threshold.

Therefore, when a smart device's activeness is detected to be greater than the preset threshold, the server can determine that this smart device is in active state. When a smart device's activeness is detected not to be greater than the preset threshold, the server can determine that this smart device is in non-active state.

For example, assuming that the preset threshold is 5 in the embodiments of present disclosure. The server can calculate the activeness of the five smart devices with the method shown in step 205, and then determine that there are smart devices with activeness greater than the preset threshold among the five smart devices since both the activeness of the mobile phone A and the activeness of the TV E are greater than 5. Then, step 207 can be executed.

Noticeably, after the server sets the state parameters of the M-L smart devices that do not upload the state parameters as the preset default values, the activeness acquired by calculating the preset default values in accordance with the activeness calculation algorithm shown in above formula (1) should be less than the preset threshold. That is to say, the server can determine that the smart devices that do not upload the state parameters are in the non-active state, in accordance with the preset default values.

In step 207, smart device(s) with activeness greater than the threshold are determined as the target smart device(s), among the one or a plurality of smart devices.

For example, mobile phone A's activeness is 35 and TV E's activeness is 30 and the activeness of the both smart devices is greater than the threshold 5, therefore, the server can determine mobile A and TV E as the target smart devices.

In step 208, the prompting message is sent to the one or a plurality of smart devices.

If the server detects there is no smart device with activeness greater than the preset threshold among the one or a plurality of smart devices in step 206, the server may also send the prompting message to each smart device among the one or a plurality of smart devices respectively. This prompting message is to prompt the user that there is a push message. Since the prompting message data is relatively small, it will not use too much network resource even though the prompting message is sent to every smart device. For example, if the instant message server concludes that the activeness of each of the five smart devices is less than 5 through calculation, the instant message server can determine that there is no smart device with activeness greater than the preset threshold among the five smart devices, which means that no smart device is in the active state. Therefore, the server can send the prompting message to each of the five smart devices respectively: you have a new push message.

In step 209, when the feedback information sent from any one of the one or a plurality of smart devices is received, this smart device sending the feedback information will be determined as the target smart device.

After the one or a plurality of smart devices receive the prompting message sent from the server, the prompting message will be displayed or broadcast. If the user looks up and reads the prompting message on one of the smart devices, and desires to accept the push message, he/she can trigger the accepting instruction via a preset operation. This smart device can send feedback information to the server in accordance with the accepting instruction. After the server receives the feedback information, it can determine the smart device that sends the feedback information as the smart device in active state, i.e. the target smart device. Thus, it can guarantee that the user will be able to read the push message in time when he/she looks up the push message under the condition that the one or a plurality of smart device bound to the user account are in the non-active state.

Figure 5A:
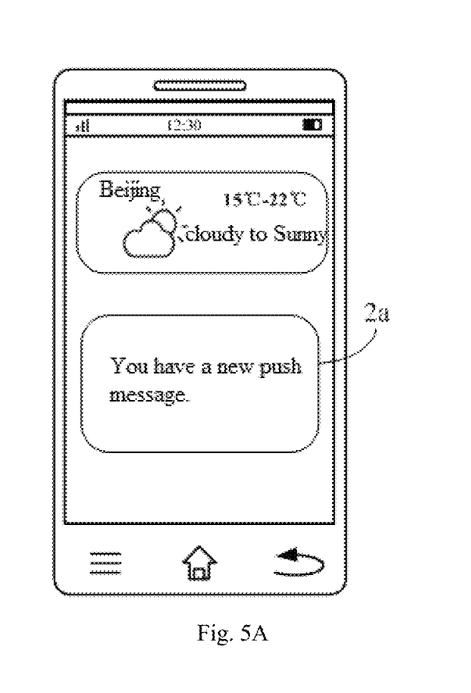
FIG. 5A is a schematic diagram of displaying a notification message on a mobile phone shown in accordance with one or more exemplary embodiments.
Figure 5B:
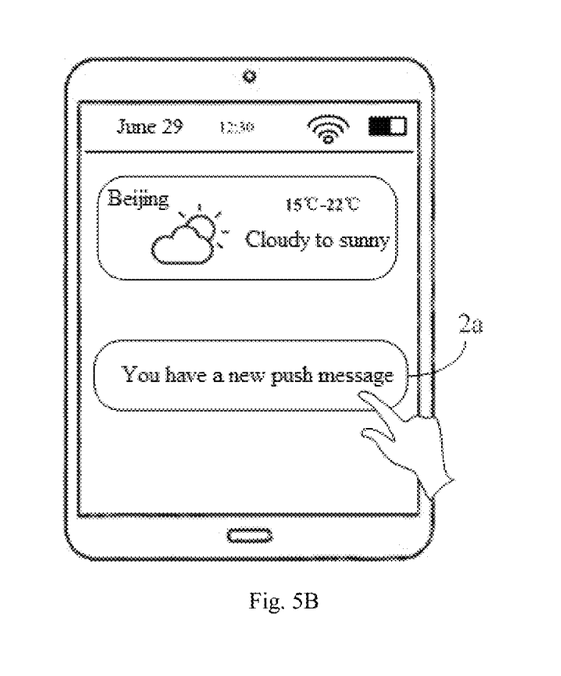
FIG. 5B is a schematic diagram of displaying a notification message on a tablet shown in accordance with one or more exemplary embodiments.
Figure 5C:
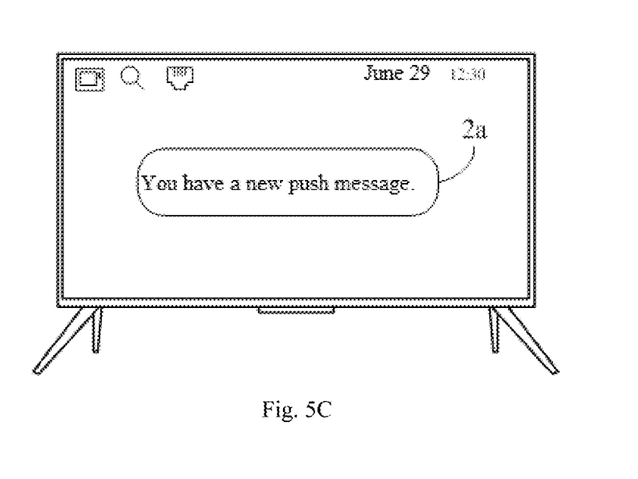
FIG. 5C is a schematic diagram of displaying a notification message on a smart TV shown in accordance with one or more exemplary embodiments.

FIG. 5A illustrates displaying a notification message on a mobile phone in accordance with one or more exemplary embodiments. FIG. 5B illustrates displaying a notification message on a tablet in accordance with one or more exemplary embodiments. FIG. 5C illustrates displaying a notification message on a smart TV in accordance with one or more exemplary embodiments. For example, assuming that among the five smart devices, mobile A, table C, and TV E are in the on mode, and mobile B and laptop computer D are in the off mode. Then, mobile A, tablet C, and TV E may display the prompting message 2a on the display screen as shown from FIG. 5A to FIG. 5C after the five smart devices receive the prompting message. If the user looks up the tablet C, reads the prompting message and clicks the display area where the prompting message 2a is located, the table C can accept the accepting instruction and send the feedback information to the instant message server to acquire the push message. After the server receives the feedback information sent from the tablet C, it can determine that the user is able to read the push message though tablet C, thereby determining the tablet C as the target smart device.

In step 210, the number of the at least one target smart device is checked. The server may determine how many target smart devices are to be treated as target smart devices.

After the server determines the target smart device(s) among the one or a plurality of smart devices by executing step 210, it also can check the number of the at least one target smart device before sending the push message to the at least one target smart device. The server can execute step 211 hereafter, when the number of the at least one target smart device is greater than 1.

In step 211, the push message is sent to the target smart device with the highest activeness when the number of the target smart devices is greater than 1.

In some embodiments of the present disclosure, when the number of the target smart devices is greater than 1, in order to further reduce the use of network resource by the push message and improve the efficiency of pushing message, the server can send the push message to the target smart device with the highest activeness. Since the target smart device with the highest activeness may be the smart device which is being used or was just used recently by the user, sending the push message to the target smart device with the highest activeness can guarantee that the user will be able to read the push message in time.

Figure 6:
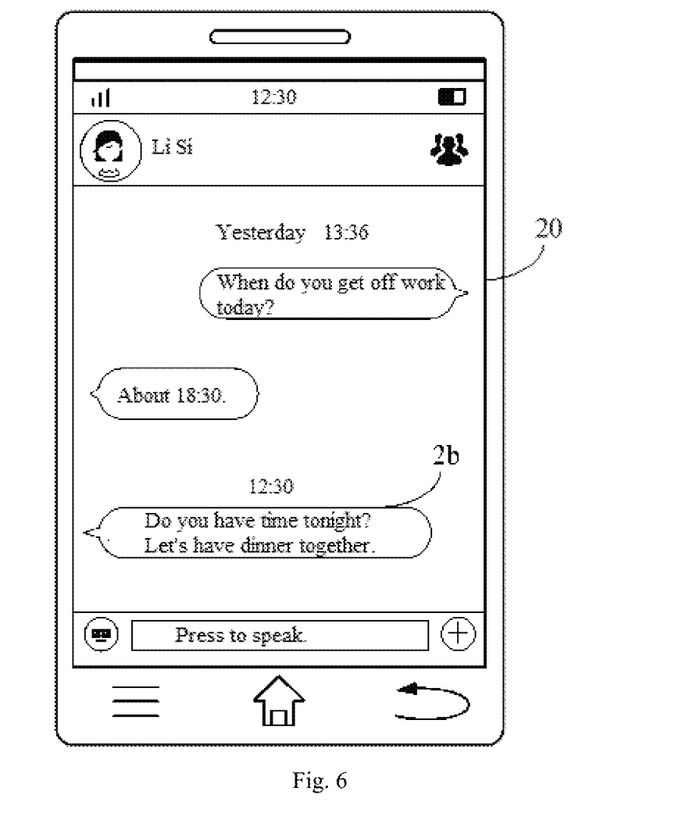
FIG. 6 is a schematic diagram of displaying a push message on a smart device shown in accordance with one or more exemplary embodiments.

For example, when the instant message server determines that the target smart devices are mobile phone A and TV E, the instant message server can send the push message "Do you have time tonight? Let's have dinner together" to the mobile phone A since the activeness of mobile phone A is higher than the activeness of TV E. FIG. 6 illustrates displaying the push message on a smart device in accordance with one or more exemplary embodiments. As shown in FIG. 6, after the mobile phone A receives the instant message, it can display the push message 2b "Do you time tonight? Let's have dinner together" in the instant message interface 20. Since the mobile phone A has the highest activeness, which means it is being used or was just used recently by the user, sending the push message to the mobile phone A not only can guarantee that the user will be able to look up and read push message in time but also can avoid the message from being sent repeatedly, so that the efficiency of pushing message can be improved effectively.

In addition, from the weighting corresponding to each sub-parameter shown in Table 3, it can be concluded that when the current screen mode of the smart device is the awake mode, the more touch operations the user has completed, the higher activeness the smart device will have; when the screen of each smart device is in the off mode, the smart device with which the user had the most frequent operations or the last operation within the preset period of time will have the relatively high activeness. Therefore, the server can determine the smart devices that are in active state and the smart device that has the highest activeness relatively accurately in accordance with each smart device's activeness. Sending the push message to the smart devices with the relatively high activeness can guarantee that the user will be able to look up and read the push message in time, thereby improving the accuracy of pushing message.

For example, assuming that the smart devices bound to the user account include: a smart air conditioner, a smart TV, and a smart rice cooker. If the user turns on the smart air conditioner at 12:20, turns on the smart TV later and keeps watching TV programs from different channels, and the rice cooker is turned off at the same time, the server can conclude that the smart TV has the highest activeness through calculation in accordance with the correlation between the sub-parameters and the weightings shown in FIG. 3 after it receives the state parameters uploaded by the three smart devices at 12:30 and sends the push message to the smart TV. Since the user is watching TV programs from different channel on the smart TV, he she can look up and read the push message in time when the smart TV accepts and displays the push message.

Or, assuming that the smart devices bound to the user account include: a desktop computer, a mobile phone, and a tablet. When the server receives the state parameters of the three smart devices at 12:30, the screens of the three smart devices are all in the off mode and the last operation the user had among the three devices happens on the mobile phone at 12:01. The server can conclude that the mobile phone has the highest activeness through calculation in accordance with the state parameters uploaded by the three smart devices and the correlation between the sub-parameters and the weightings shown in FIG. 3, and sends the push message to the mobile phone. Since the mobile phone is the last smart device the user ever used, it can guarantee that the user will be able to look up and read the push message in time by sending the push message to the mobile phone.

In another embodiment of the present disclosure, the server can also send the push message to each target smart device individually when the number of the target smart devices is greater than 1. For example, the instant message server can send the push message "Do you have time tonight? Let's have dinner together" to the mobile phone A and TV E simultaneously.

In an embodiment of the present disclosure, the server can further calculate the activeness difference between any two target smart devices when the number of the target smart devices is greater than 1. The server can determine that the probability that the user is using or recently used the target smart device with the highest activeness is high when the activeness difference between this target smart device with the highest activeness and any other target smart device is greater than the preset difference threshold. Therefore, the push message can be sent to the target smart device with the highest activeness. When the activeness difference between any two target smart devices is less than the preset difference threshold, the server can determine that the plurality of target smart devices have similar activeness. Here, the server can send the push message to each target smart device, to guarantee that the user will be able to look up and read the push message in time.

Noticeably, in the embodiments of the present disclosure, the order of the execution steps in the message pushing method is adjustable and the steps can be added or deleted accordingly. For example, step 210 and step 204 can be deleted accordingly. In the technical scope of the present disclosure, any variations of the message pushing method that can be easily made by a person skilled in the art are protected by the present disclosure, and will not be described again therein.

In summary, a message pushing method is described in the embodiments of the present disclosure. With this message pushing method, the server may send the push message to the at least one target smart device in the active state. Since the server does not need to push the message to every smart device any more, it can reduce the use of network resource when the message is pushed so that it can improve the efficiency of pushing message. Since each target smart device is the smart the device in active state, it can guarantee that the user will be able to read the push message in time.

In one or more exemplary embodiments, there is provided a message pushing apparatus. The apparatus is applied to a server and comprises: a processor; and a memory storage storing executable instructions executed by the processor; wherein the processor is configured to perform the message pushing method described in above embodiments.

Figure 7:
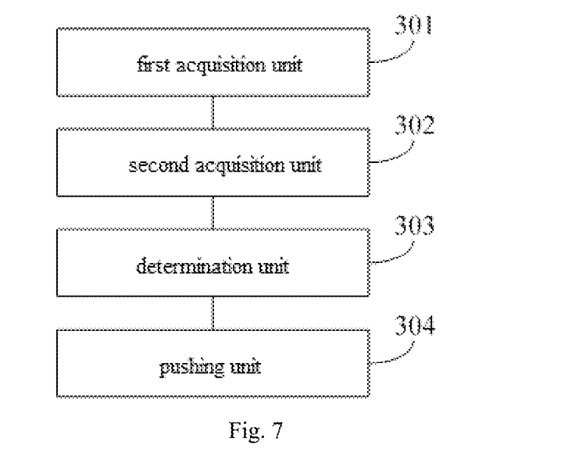
FIG. 7 is a structural schematic diagram of a message pushing apparatus shown in accordance with one or more exemplary embodiments.

FIG. 7 is a structural schematic diagram of a message pushing apparatus shown in accordance with one or more exemplary embodiments. The message pushing apparatus can be applied to the server shown in FIG. 1. Referring to FIG. 7, the apparatus comprises: a first acquisition unit 301, configured to acquire a push message corresponding to a target user account; a second acquisition unit 302, configured to acquire a state parameter of each of one or a plurality of smart devices bound to the target user account; a determination unit 303, configured to determine at least one target smart device in accordance with the acquired state parameters, wherein each target smart device is the smart device in active state; and a pushing unit 304, configured to send the push message to the at least one target smart device.

Figure 8:
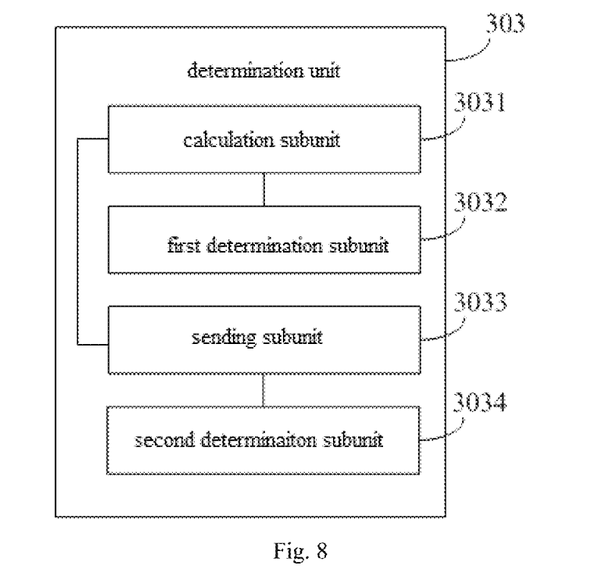
FIG. 8 is a structural schematic diagram of a determination unit shown in accordance with one or more exemplary embodiments.

FIG. 8 is a structural schematic diagram of a determination unit shown in accordance with one or more exemplary embodiments. As shown in FIG. 8, the determination unit 303 comprises: a calculation subunit 3031, configured to calculate each smart device's activeness in accordance with a preset activeness calculation algorithm and the state parameter of each smart device; and a first determination subunit 3032, configured to determine smart device(s) with activeness greater than a preset threshold as the target smart device(s), among the one or the plurality of smart devices.

In some embodiments, the state parameter of each smart device includes N sub-parameters and N is a positive while number; the calculation subunit 3031 is configured to: acquire the weighting corresponding to each of the N sub-parameters of each smart device: and determine each smart device's activeness in accordance with the weighting corresponding to each sub-parameter, wherein the activeness $W_i$ of the $i^{th}$ smart device satisfies:

$$W_i = \sum_{j=1}^{N} W_{ij},$$

$W_{ij}$ is the weighting of the $j^{th}$ sub-parameter of the $i^{th}$ smart device and j is a positive integer less than or equal to N.

In some embodiments, acquiring the weighting corresponding to each of the N sub-parameters of each smart device by the calculation subunit 3031 may comprise: determining, among the N sub-parameters of each smart device, a value range in which a parameter value of each sub-parameter is; and determining the weighting corresponding to the value range in which the parameter value of each sub-parameter is, in accordance with a correlation between the value range and the weighting saved in advance.

In some embodiments, the pushing unit 304 is configured to check the number of the at least one target smart device: and send the push message to the target smart device with the highest activeness, when the number of the at least one target smart device is greater than 1.

In some embodiments, referring to FIG. 8, the determination unit 303 can also comprise: a sending subunit 3033 configured to send a prompting message to the one or a plurality of smart devices respectively, when there is no smart device with activeness greater than the preset threshold among the one or a plurality of smart deices; and a second determination subunit 3034 configured to determine any smart device sending feedback information as the target smart device, when the feedback information sent from the smart device among the one or a plurality devices is received.

In some embodiments, the state parameter includes at least one of current screen mode, touch operation times received within a preset period and elapsed time between the last received touch operation moment and the present moment.

In some embodiments, the first acquisition unit 301 is configured to: send a state acquisition request to each of the M smart devices bound to the target user account respectively; receive the state parameters uploaded by L of the M smart devices, wherein M satisfies: M≥1 and L satisfies: 0≤L≤M: and set the state parameters of the rest M-L of the M smart devices as preset default values.

In some embodiments, activeness acquired by calculating the preset default values in accordance with the preset activeness calculation algorithm is less than the preset threshold.

In summary, a message pushing apparatus is provided in the embodiments of the present disclosure. With this message pushing apparatus, the server can send the push message to the at least one target smart device in active state. Since the server does not need to push the message to every smart device any more, it can reduce the use of network resource when the message is pushed so that it can improve the efficiency of pushing message. Since each target smart device is the smart device in active state, it can guarantee that the user will be able to read the push message in time.

With respect to the apparatuses in the above embodiments, the specific manners for performing operations for individual modules therein have been described in detail in the embodiments regarding the methods, which will not be elaborated herein.

Figure 9:
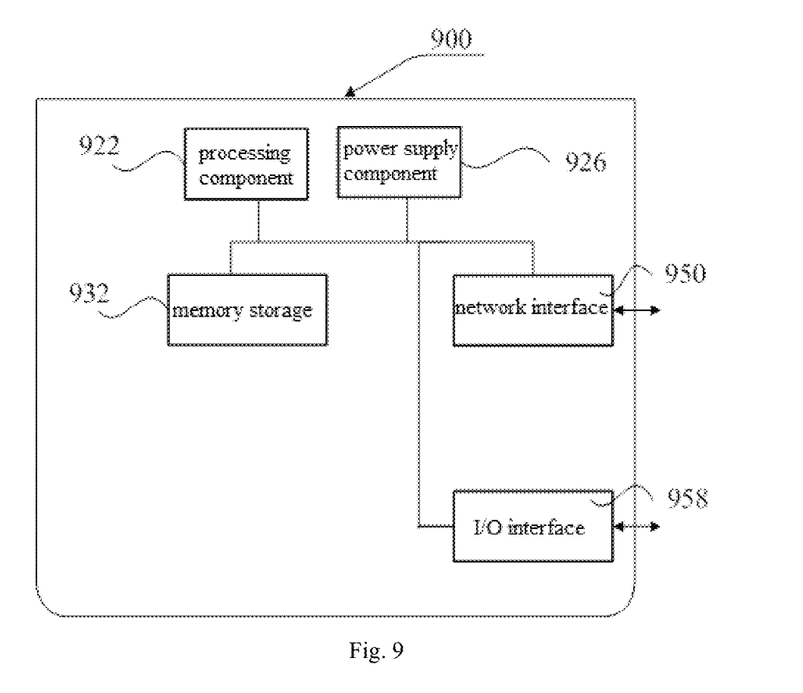
FIG. 9 is a structural schematic diagram of another message pushing apparatus shown in accordance with one or more exemplary embodiments.

FIG. 9 is a structural schematic diagram of a message pushing apparatus 900 shown in accordance with one or more exemplary embodiments. For example, the apparatus 900 can be provided as a server. Referring to FIG. 9, the apparatus 900 includes a processing component 922 that further comprises one or more processors and a memory resource which is represented by memory storage 932. The memory resource is used to save the instructions, such as applications, executed by the processing component 922. The applications saved in the memory storage 932 could include one or more than one modules, which correspond to a set of instructions. Moreover, the processing component 922 is configured to execute instructions, to perform the message pushing method above.

The apparatus 900 could also comprise a power supply component 926, which is configured to manage the power supply of device 900, a wired or wireless network interface 950, which is configured to connect the device 900 to network, and an input and output (I/O) interface 958. The device 900 is capable of operating operating systems saved in the memory storage 932 such as Windows Server™, Mac OS X™, Unix™, Linux™ and FreeBSD™, or the like.

In one or more exemplary embodiments, there is also provided a non-transitory computer readable storage medium. The non-transitory computer readable storage medium may include the memory storage 932 storing at least an instruction, a program, a code set or instruction set, loaded and executed on the processing component 922 of the device 900 for implementing the message pushing described in above embodiments. For example, the non-transitory computer readable storage medium may be a ROM, a RAM, a CD-ROM, a magnetic tape, a floppy disk, an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A message pushing method applied to server, comprising:
   acquiring a push message corresponding to a target user account;
   acquiring a state parameter for each smart device that is bound to the target user account;
   determining whether each smart device is in an active state based on the state parameter; and
   sending the push message to at least one target smart device in the active state,
   wherein the determining whether each smart device is in an active state based on the state parameter comprises:
   calculating each smart device's activeness in accordance with the state parameter of each smart devices,
   wherein the calculating each smart device's activeness in accordance with the state parameter of each smart devices comprises:
   acquiring a weighting corresponding to each of N sub-parameters of each smart device, wherein the state parameter of each smart device includes the N sub-parameters, N is a positive whole number; and
   determining each smart device's activeness in accordance with the weighting corresponding to each sub-parameter, wherein a activeness $W_i$ of a $i^{th}$ smart device satisfies:

$$W_i = \sum_{j=1}^{N} W_{ij},$$

$W_{ij}$ is the weighting of a $j^{th}$ sub-parameter of the $i^{th}$ smart device, and wherein acquiring the weighting corresponding to each of N sub-parameters of each smart device comprises:
determining, among the N sub-parameters of each smart device, a value range in which a parameter value of each sub-parameter is; and determining the weighting corresponding to the value range in which the parameter value of each sub-parameter is, in accordance with a correlation between the value range and a pre-stored weighting.

2. The method of claim 1, wherein determining whether each smart device is in an active state based on the state parameter further comprises:
determining that the smart device is in the active state when its activeness is greater than a preset threshold.

3. The method of claim 2, wherein sending the push message to the at least one target smart device comprises:
checking a number of the at least one target smart device; and
sending the push message to the target smart device with the highest activeness, when the number of the at least one target smart device is greater than 1.

4. The method of claim 2, further comprising:
after calculating each smart device's activeness,
sending a prompting message to the one or a plurality of smart devices respectively, when there is no smart device with activeness greater than the preset threshold among the one or a plurality of smart devices; and
determine any smart device sending feedback information as the target smart device, when the feedback information sent from the smart device among the one or a plurality of smart devices is received.

5. The method of claim 1, wherein
the state parameter includes at least one of current screen mode, touch operation times received within a preset period and elapsed time between a moment when receiving the last touch operation and a present moment.

6. The method of claim 1, wherein acquiring the state parameter for each smart device that is bound to the target user account comprises:
sending a state acquisition request to each of M smart devices bound to the target user account respectively;
receiving the state parameters uploaded by L of the M smart devices, wherein M is a positive integer and L not greater than M; and
setting the state parameters of the rest M-L of the M smart devices as preset default values, wherein the preset default values indicate that the M-L smart devices are in a non-active state.

7. A message pushing apparatus applied to a server, comprising:
a processor; and
a memory storage storing executable instructions executed by the processor,
wherein the processor is configured to:
acquire a push message corresponding to a target user account;
acquire a state parameter of each of smart device that is bound to the target user account;
determine at least one target smart device by determining whether each smart device is in an active state in accordance with the acquired state parameter;
send the push message to the at least one target smart device in the active state; and
calculate each smart device's activeness in accordance with the state parameter of each smart devices, to determine whether each smart device is in an active state based on the state parameter,
wherein the processor is further configured to:
acquire a weighting corresponding to each of N sub-parameters of each smart device, wherein the state parameter of each smart device includes the N sub-parameters, N is a positive whole number; and
determine each smart device's activeness in accordance with the weighting corresponding to each sub-parameter, wherein a activeness $W_i$ of a $i^{th}$ smart device satisfies:

$$W_i = \sum_{j=1}^{N} W_{ij},$$

$W_{ij}$ is the weighting of a $j^{th}$ sub-parameter of the $i^{th}$ smart device; and
wherein the processor is further configured to:
determine, among the N sub-parameters of each smart device, a value range in which a parameter value of each sub-parameter is; and
determine the weighting corresponding to the value range in which the parameter value of each sub-parameter is, in accordance with a correlation between the value range and a pre-stored weighting.

8. The apparatus of claim 7, wherein the processor is further configured to:
determine that the smart device is in the active state when its activeness is greater than a preset threshold.

9. The apparatus of claim 8, wherein the processor is further configured to:
check a number of the at least one target smart device; and
send the push message to the target smart device with the highest activeness, when the number of the at least one target smart device is greater than 1.

10. The apparatus of claim 8, wherein the processor is further configured to:
send a prompting message to the one or a plurality of smart devices respectively, when there is no smart device with activeness greater than the preset threshold among the one or a plurality of smart deices; and
configured to determine any smart device sending feedback information as the target smart device, when the feedback information sent from the smart device among the one or a plurality of smart devices is received.

11. The apparatus of claim 7, wherein
the state parameter includes at least one of current screen mode, touch operation times received within a preset period and elapsed time between a moment when receiving the last touch operation and a present moment.

12. The apparatus of claim 7, wherein the processor is further configured to:
send a state acquisition request to each of M smart devices bound to the target user account respectively;
receive the state parameters uploaded by L of the M smart devices, wherein M is a positive integer and L is not greater than M; and
set the state parameters of the rest M-L of the M smart devices as preset default values, wherein the preset default values indicate that the M-L smart devices are in a non-active state.

13. A non-transitory computer readable storage medium, comprising instructions stored in the non-transitory computer readable storage medium, the instructions, when executed on a processor, causing the processor to perform acts comprising:

acquiring a push message corresponding to a target user account;

acquiring a state parameter for each smart device that is bound to the target user account; and determining whether each smart device is in an active state based on the state parameter, wherein the determining whether each smart device is in an active state based on the state parameter comprises:

acquiring a weighting corresponding to each of N sub-parameters of each smart device, wherein the state parameter of each smart device includes the N sub-parameters, N is a positive whole number;

determining each smart device's activeness in accordance with the weighting corresponding to each sub-parameter, wherein a activeness $W_i$ of a $i^{th}$ smart device satisfies:

$$W_i = \sum_{j=1}^{N} W_{ij},$$

$W_{ij}$ is the weighting of a $j^{th}$ sub-parameter of the $i^{th}$ smart device; and sending the push message to at least one target smart device in the active state, and wherein acquiring the weighting corresponding to each of N sub-parameters of each smart device comprises:

determining, among the N sub-parameters of each smart device, a value range in which a parameter value of each sub-parameter is; and determining the weighting corresponding to the value range in which the parameter value of each sub-parameter is, in accordance with a correlation between the value range and a pre-stored weighting.

14. The non-transitory computer readable storage medium of claim 13, wherein the acts further comprise:

determining that the smart device is in the active state when its activeness is greater than a preset threshold.

* * * * *